(12) United States Patent
Belissent et al.

(10) Patent No.: US 7,058,683 B1
(45) Date of Patent: Jun. 6, 2006

(54) METHODS AND APPARATUS FOR PROVIDING A VIRTUAL HOST IN ELECTRONIC MESSAGING SERVERS

(75) Inventors: Jacques E. Belissent, Mountain View, CA (US); Frederic C. Batty, Redwood City, CA (US); Timothy C. Misner, Palo Alto, CA (US); Daryl A. Huff, Saratoga, CA (US); Anil K. Srivastava, Redwood City, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/521,282

(22) Filed: Mar. 7, 2000

Related U.S. Application Data

(60) Provisional application No. 60/144,709, filed on Jul. 20, 1999.

(51) Int. Cl.
*G06F 15/16* (2006.01)

(52) U.S. Cl. ............... 709/206; 709/207; 709/245

(58) Field of Classification Search ............... 709/206, 709/223, 225, 226, 245, 207, 220; 713/201; 710/10; 707/3
See application file for complete search history.

(56) References Cited

U.S. PATENT DOCUMENTS

| | | | |
|---|---|---|---|
| 5,263,157 A | 11/1993 | Janis | |
| 5,542,088 A | 7/1996 | Jennings et al. | |
| 5,649,099 A | 7/1997 | Theimer et al. | |
| 5,706,349 A | 1/1998 | Aditham et al. | |
| 5,734,831 A | 3/1998 | Sanders | |
| 5,758,077 A | 5/1998 | Danahy et al. | |
| 5,790,790 A | 8/1998 | Smith et al. | |
| 5,809,331 A * | 9/1998 | Staats et al. | 710/10 |
| 5,812,780 A | 9/1998 | Chen et al. | |
| 5,822,526 A | 10/1998 | Waskiewicz | |
| 5,835,727 A | 11/1998 | Wong et al. | |
| 5,873,067 A | 2/1999 | Kobayashi | |
| 5,913,041 A | 6/1999 | Ramanathan et al. | |
| 5,925,126 A | 7/1999 | Hsieh | |
| 5,930,474 A * | 7/1999 | Dunworth et al. | 709/217 |
| 5,987,508 A * | 11/1999 | Agraharam et al. | 709/217 |
| 6,058,425 A | 5/2000 | White | |
| 6,067,568 A | 5/2000 | Li et al. | |
| 6,085,238 A * | 7/2000 | Yuasa et al. | 709/223 |
| 6,097,797 A | 8/2000 | Oseto | |
| 6,105,027 A | 8/2000 | Schneider et al. | |
| 6,131,120 A * | 10/2000 | Reid | 709/225 |

(Continued)

OTHER PUBLICATIONS

Thomas, Mike. Linux Journal: Virtual Domains and qmail. Jun. 1, 1998, www.linuxjournal.com/print/php?sid=2313.

(Continued)

*Primary Examiner*—David Wiley
*Assistant Examiner*—Michael Delgado
(74) *Attorney, Agent, or Firm*—Beyer, Weaver & Thomas, LLP.

(57) ABSTRACT

According to the present invention, methods, apparatus, and computer readable medium are disclosed for defining a virtual domain in an electronic messaging system are disclosed. A virtual domain node is defined that corresponds to a real (non-virtual) domain. The virtual domain node resided in a hierarchically organized directory. A plurality of virtual domain attributes are then assigned to the virtual domain node. The directory is a tree based hierarchical directory arranged in such a way even in a multiple domain environment, a name search operation is executed as if in a flat name space.

26 Claims, 8 Drawing Sheets

U.S. PATENT DOCUMENTS

| | | | |
|---|---|---|---|
| 6,144,959 A | 11/2000 | Anderson et al. | 707/9 |
| 6,158,007 A | 12/2000 | Moreh et al. | 713/201 |
| 6,167,431 A | 12/2000 | Gillies et al. | |
| 6,226,751 B1 * | 5/2001 | Arrow et al. | 713/201 |
| 6,247,057 B1 | 6/2001 | Barrera, III | |
| 6,298,375 B1 | 10/2001 | Millard | |
| 6,304,892 B1 * | 10/2001 | Bhoj et al. | 709/202 |
| 6,327,608 B1 | 12/2001 | Dillingham | 709/203 |
| 6,339,423 B1 | 1/2002 | Sampson et al. | |
| 6,366,950 B1 * | 4/2002 | Scheussler et al. | 709/206 |
| 6,393,463 B1 | 5/2002 | Fuchigami | |
| 6,408,336 B1 | 6/2002 | Schneider et al. | 709/229 |
| 6,425,003 B1 * | 7/2002 | Herzog et al. | 709/223 |
| 6,434,600 B1 * | 8/2002 | Waite et al. | 709/206 |
| 6,453,344 B1 | 9/2002 | Ellsworth et al. | |
| 6,453,353 B1 | 9/2002 | Win et al. | 709/229 |
| 6,470,389 B1 | 10/2002 | Chung et al. | |
| 6,473,786 B1 | 10/2002 | Scouras et al. | 709/206 |
| 6,493,749 B1 | 12/2002 | Paxhia et al. | |
| 6,499,108 B1 | 12/2002 | Johnson | |
| 6,611,861 B1 * | 8/2003 | Schairer et al. | 709/217 |
| 6,643,690 B1 | 11/2003 | Duursma et al. | |
| 6,708,187 B1 | 3/2004 | Shanumgam et al. | 707/201 |

OTHER PUBLICATIONS

Caplin, Barry. Virtual domain email. Sep. 5, 1995. www.mtiweb.com/isp/vemail.html.

Newton, H. Newton's Telecom Directory, Telecom Books, pp. 246-247, Oct., 1998.

Newton, H. *Newton's Telecom Dictionary,* Telecom Books, pp. 246-247, Oct., 1998.

* cited by examiner

METHODS AND APPARATUS FOR PROVIDING A VIRTUAL HOST IN ELECTRONIC MESSAGING SERVERS

CROSS-REFERENCE TO A RELATED APPLICATIONS

This application takes priority under 35 U.S.C. § 119(e) of U.S. Patent Application No. 60/144,709 filed Jul. 20, 1999 naming Daryl Huff, et al. as inventor(s) and assigned to the assignee of the present application which is also incorporated herein by reference for all purposes. This application is also related to the following co-pending U.S. patent applications, which are filed concurrently with this application and each of which are herein incorporated by reference, (i) U.S. Pat. No. 6,557,036 entitled "METHODS AND APPARATUS FOR MONITORING ELECTRONIC MAIL SYSTEMS" naming Kavacheri et al as inventors; (ii) U.S. Pat. No. 6,865,594 entitled "METHOD AND APPARATUS FOR AUTOMATICALLY GENERATING A ROUTING TABLE IN A MESSAGING SERVER" NAMING BELISSENT ET AL AS INVENTORS; (iii) U.S. Pat. No. 6,374,292 entitled "PRECEDENCE RULES IN ELECTRONIC MESSAGING SERVERS", naming Huff et al as inventors; and (iv) U.S. patent application Ser. No. 09/519,948 entitled "METHODS AND APPARATUS FOR DELEGATING ADMINISTRATIVE CAPABILITIES TO DOMAINS SERVED BY EMAIL PROVIDERS", naming Abbott et al as inventors.

FIELD OF THE INVENTION

The present invention relates in general to client/server data communication systems and, more particularly, to a mail server included in an electronic mail system for use within a client/server data processing system. More particularly still, the present invention is directed towards a method and apparatus for defining a virtual domain in an email system.

BACKGROUND OF THE INVENTION

Computer systems are well known in the art and have become a business staple and are also found in many homes. One feature available to the business world is that of using electronic mailing (email) to send and receive messages and other information to and from one another in a business setting. Similarly, home computers, such as desk tops or laptops, and other information devices, such as personal digital assistants (PDAs), allow telecommuting such that a user can connect to the user's work server and down load and upload messages.

The email system allows clients of a network system, which is maintained by a server system, to send messages or data from one user to another. In order to minimize disk space and requirements as well as to maximize functionality and consistency of the electronic mailing engine used in the network system, the engine is typically located on the server and is merely accessed by a client in order to send messages or retrieve messages to or from another user or client on the server system. In this way, the client system typically allows the user to perform such operations as composing, updating, and sending messages while the server in such a system provides, in part, a server based message repository as well as providing message transmission and reception functions for the user at the client level.

A traditional email system 100, configured to operate in what is referred to as a consumer host mode, is illustrated in FIG. 1. The email system 100 includes a number of consumers and/or businesses 102-1 ("abc.com") through 102-n ("xyz.gov") each of which is coupled to a service provider (SP) 104 ("isp.net"). Traditionally, the service provider (SP) 104 provides the various consumers and/or businesses 102 with just an unprotected IP router. The consumers and/or businesses 102 also operate and maintain their own application servers, including the email server, DNS server, and (if needed) LDAP server (not shown). For their own protection, each of the consumers and/or businesses 102 must operate through a firewall that filters out undesirable packets and insulates the organization's internal network from the Internet. Notice that for many organizations, especially small ones, the email server may actually be the firewall system.

In the email system 100, those consumers and/or businesses 102-1 through 102-n who wish to read their mail must be connected to a service provider (SP) email server 106. The SP 106 also operates an email mailbox 108, and a DNS server 110 that provides the following services, a primary master server for the SP's own domain (ISP.net), to designate as the root server for all consumers and/or businesses, act as a primary master server for consumers and/or businesses who do not wish to maintain their own public DNS server, and as a secondary server for consumers and/or businesses who prefer to maintain their own public server.

As part of the services provided by the SP 106, an SMTP relay host 112 that is managed by the SP offers offer a number of value added services, for which the SP may charge additional fees. In some cases, the relay host can be configured to allow the relay host to accept and hold the consumer's email when their mail server is down. However, unfortunately, the relay host imposes a significant management burden on the SP since in some cases, consumer email may live on this server for an indefinite time raising issues of backup and failure recovery. If one of the consumer servers fails because of being swamped, for example, then the consumer's email may roll over to the SP's relay host. Because of this, most SPs do not offer a relay host for those consumers and/or businesses that are hosting their own email server. The SP also provides a directory service in the form of the LDAP Directory server that is located at the consumer's site, which can be operated by the consumer. In this way, most organizations do not expose their LDAP servers to the public network for security reasons.

In the example shown in FIG. 1, a mail user in ABC, Inc. (which lawfully owns its DNS domain name abc.com, but relies on the ISP isp.net to host its email) desiring to send and receive mail uses the domain name username@abc.com even though his mailserver is really mailhost.isp.net. It also means that any user in the abc.com domain, connects to a mailhost in the domain abc.com—for example mail.abc.com—to access his/her mail.

Since the email system 100 requires a separate mail server to be supported by the SP 106 for each of the domains abc.com through xyz.gov, although well understood and easy to manage, the email system 100 is not cost effective for small domains. In addition, as the number of domains increases, the management of the individual services becomes increasingly unwieldy. Internet service providers (ISPs) have a growing interest in hosting email services for always larger and more numerous organizations. Many businesses see the ability to farm out email services as a very attractive cost-saving idea. It is therefore desirable that an email service provider be able to offer email services to multiple organizations each of which has their own virtual domain and to support the ability to define such domains in the directory and host them on a shared mail server.

For at least these and other reasons, an email architecture that can support a single mail server which, in turn, can support many different domains is desirable.

SUMMARY OF THE INVENTION

To achieve the foregoing, and in accordance with the purpose of the present invention, methods, apparatus, and computer readable medium for defining a virtual domain in an electronic mail messaging system are provided. In accordance with one aspect of the present invention, a method is disclosed where a virtual domain node is defined that corresponds to a real (non-virtual) domain. In a preferred embodiment, the virtual domain node is defined in a hierarchically organized directory. A plurality of virtual domain attributes are then associated with the virtual domain node, such attributes include a designated virtual domain administrator, a designated virtual domain postmaster, a state of the virtual domain, and a set of allowed services for the virtual domain.

In another embodiment of the invention, computer-readable medium containing programming instructions for defining a virtual domain in an electronic mail messaging system is disclosed. In one implementation, the computer readable medium contains computer code devices configured to cause a computer to execute the following operations. First, defining a virtual domain node corresponding to a real (non-virtual) domain in a hierarchically organized directory and then associating a plurality of virtual domain attributes to the virtual domain node.

In yet another embodiment, an electronic messaging system is disclosed. In one aspect of the invention, the system includes a main host computer for transferring an incoming email message between a sending subscriber and a receiving subscriber having an associated unique user name. The system also includes a messaging server coupled to the host computer that receives the incoming email message from the sending subscriber and forwards the email message to the receiving subscriber based upon the receiving subscriber's user name. The system also includes a hierarchically organized directory coupled to the messaging server arranged to define a virtual domain node corresponding to a real (non-virtual) domain having associated with it a plurality of virtual domain attributes to the virtual domain node.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

The Internet has effectively lowered the cost of electronic communication. As the number of people and organizations connected to the Internet has grown, the Internet has evolved into a new channel for communication. To facilitate Internet services, Internet messaging clients and easy-to-use web browsers have provided cost-effective way of publishing and sharing information with employees inside the enterprise as well as customers, suppliers, and partners outside. Since messaging services has become crucial to enterprise infrastructure in the 1990s, organizations are seeking messaging solutions that provide a lower cost of ownership while increasing the effectiveness and reliability of their communications network. Specifically, they are evaluating the benefits of Internet standards-based messaging systems.

Broadly speaking, the invention describes an Internet standards-based messaging system having a mail server capable of offering e-mail services to multiple organizations each of which has their own virtual domain. The invention is also able to define such virtual domains in the directory and host them on a shared mail server.

The invention will now be described in terms of an internet mail server resident on a server computer coupled to a large network of mailboxes typical of a large corporate intranet system as well as a single user coupled to a large interconnected computer network such as the Internet. It should be noted, however, that the inventive mail server is well suited to any application requiring highly reliable, scalable, and efficient information transport over a large number of computers.

Figure 1:
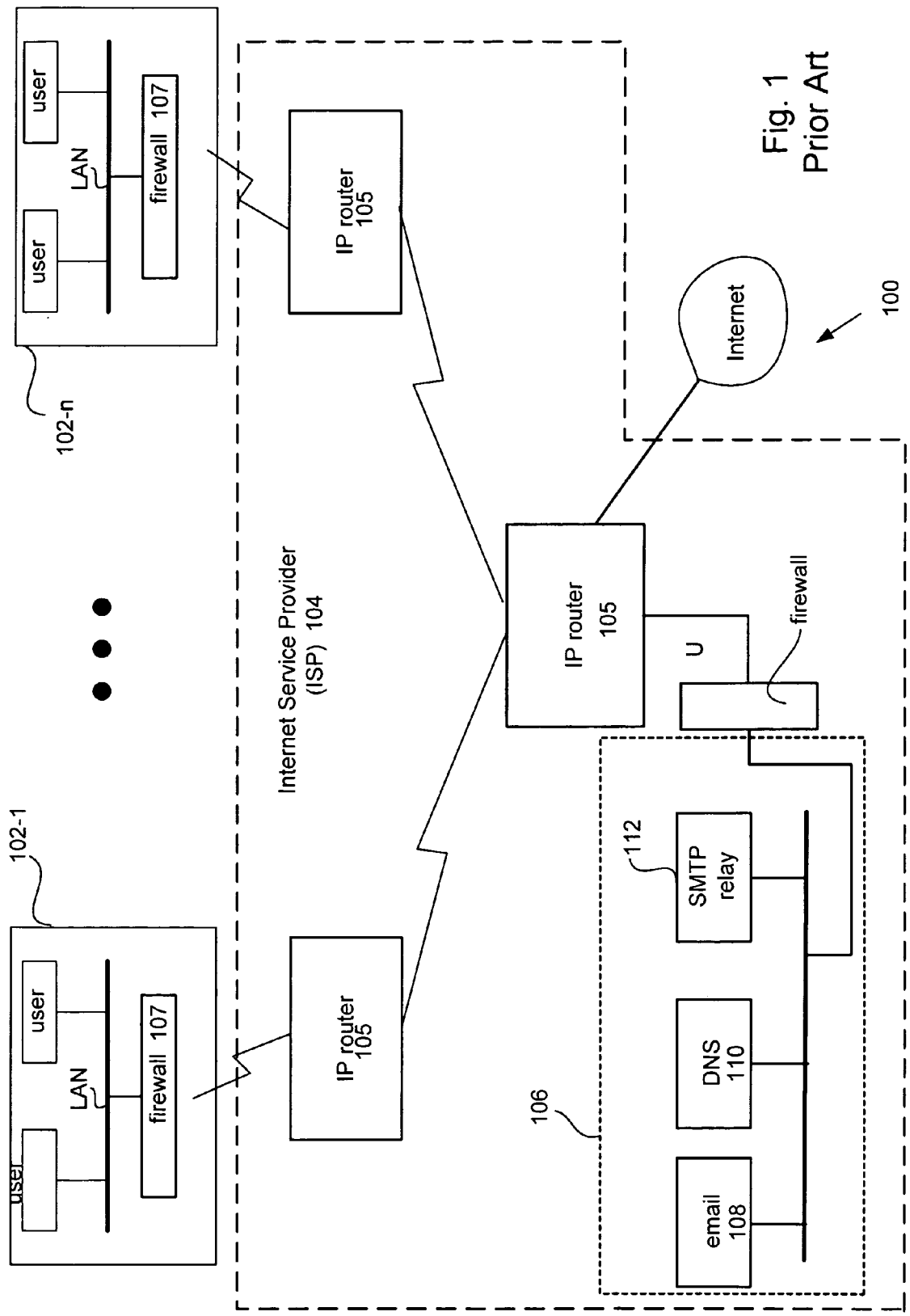
FIG. 1 illustrates a conventional customer hosted type e-mail system.
Figure 2:
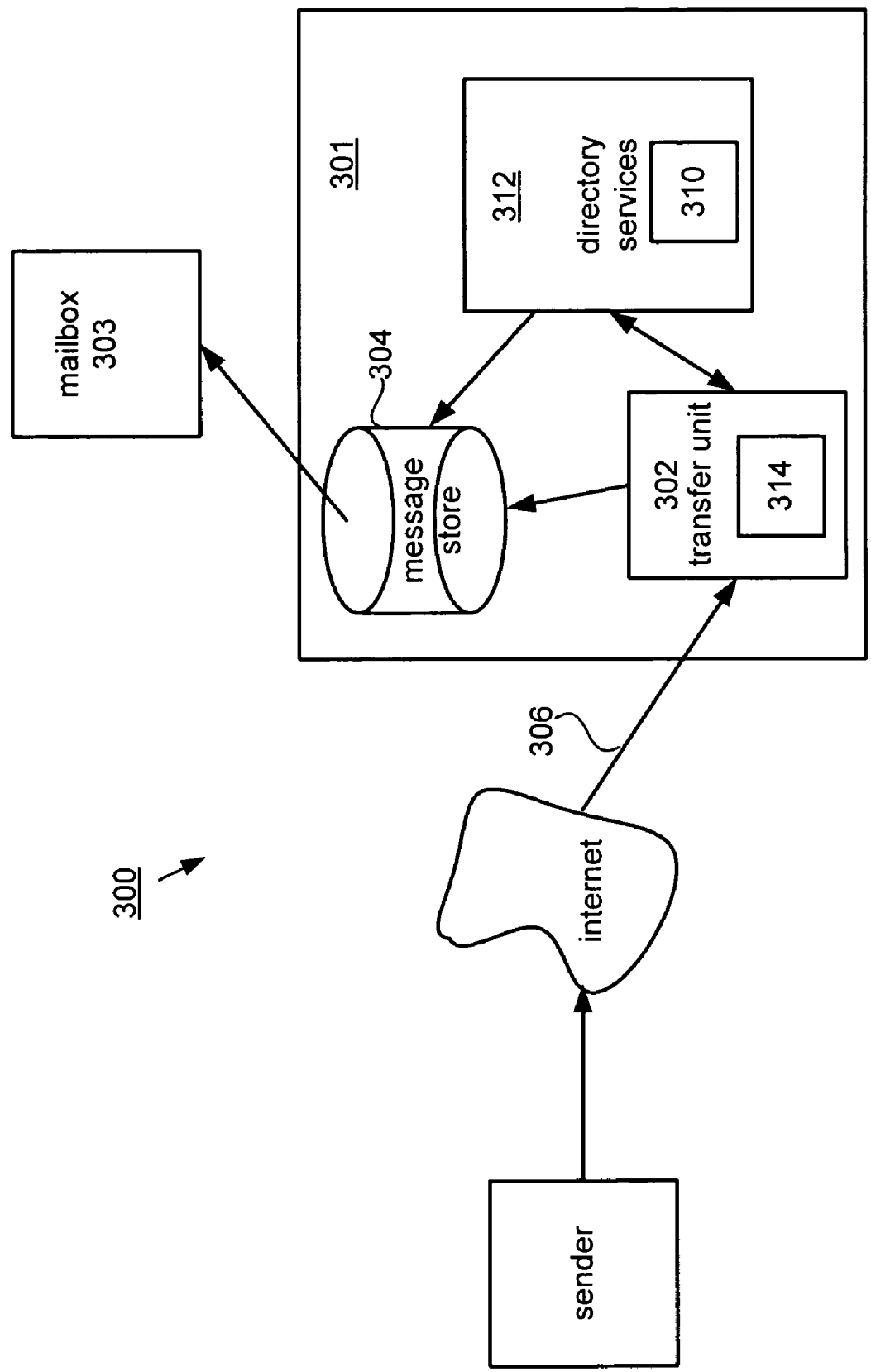
FIG. 2 shows an Internet email system in accordance with an embodiment of the invention.

Referring now to FIG. 2, an Internet email system 300 in accordance with an embodiment of the invention includes an Internet mail server 301 coupled to a user mailbox 303. In the described embodiment, the mail server 301 is a general-purpose, "store-and-forward" system for distributing computer-based mail. It should be noted that the term "store-and-forward" means that the mail server 301 automatically handles the receiving of mail messages necessitated when network links (such as those links 306 to the Internet) or other services are temporarily unavailable. In contrast to mail user agents (MUAs) that are used to create and read electronic mail messages, a transfer unit 302 included in the mail server 301 is responsible for directing messages to the appropriate network transport and ensuring reliable delivery over that transport. In a preferred embodiment, the mail server 301 includes a message store unit 304 coupled to the transfer unit 302 that is used to store messages for later transmission to the user mailbox 303.

Figure 3:
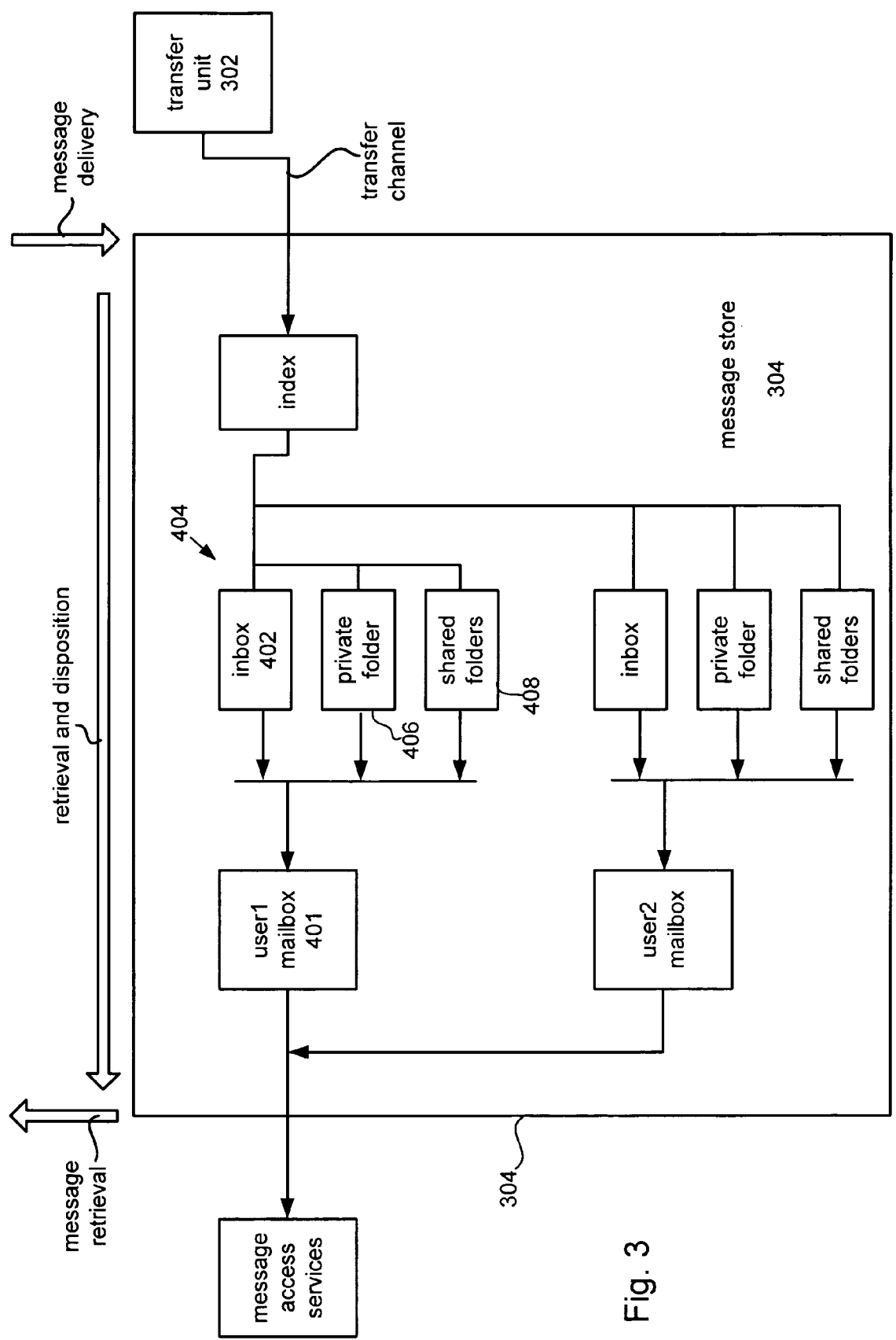
FIG. 3 shows an exemplary message store in accordance with an embodiment of the invention.

As shown in FIG. 3, in one implementation, the message store 304 in the mail server 301 is a dedicated data store for the delivery, retrieval, and manipulation of Internet mail messages. In a preferred embodiment, the message store works with the IMAP4 and POP3 to provide flexible and easy access to messaging. It saves any message that conforms to RFC 822 specifications, and recognizes the Multipurpose Internet Mail Extensions (MIME) content format.

In the described embodiment, the message store 304 is organized as a set of folders and user mailboxes. The mailbox 401 is a container for messages where each user has an inbox 402 where new mail arrives, and can have one or more folders 404 where mail can be stored. Folders 404 may contain other folders or mailboxes and may be arranged in a hierarchical tree. Mailboxes owned by an individual user are private folders 406. In addition to a user owning a folder or a mailbox, a common user or group can share the ownership of a folder or mailbox as a shared folder 408. A shared folder is similar to an email group, but instead of messages going into each member of the email group's inbox, messages addressed to the shared folder 408 go into a private folder associated with each user. It should be noted that in a preferred embodiment, the message store 304 maintains only one copy of each message. However, in those cases where the message store 304 receives a message addressed to multiple users or a group (based upon an associated distribution list), it adds a reference to the message in each user's inbox rather than having a copy of the message in each user's inbox, thereby saving disk space. In addition to the reference, the individual message's status (new, unread, replied to, deleted, and the like) is maintained per mailbox.

In the described embodiment, access to the message store 304 is multithreaded thereby allowing a single process to manage a large number of connections since each connection is handled by a thread. In this way, multithreaded access maximizes both performance and scalability by minimizing the system resources required for the management of each connection.

Referring back to FIG. 2, the delivery and routing of messages by the transfer unit 302 is based on a routing table 310 that in turn is derived from the user and group (distribution list) entries stored in a directory service unit 312. In a preferred embodiment, the directory service unit 312 is the central repository for meta-information: user profiles, distribution lists, and other system resources based upon, in some embodiments, a dedicated Lightweight Directory Access Protocol (LDAP) directory service. This directory supports the storage of information according to a directory information tree (DIT) which is a hierarchical structure that resembles a tree with one major branch at the top and many branches and sub-branches below. The arrangement of the tree is flexible, allowing administrators to decided how to best deploy the service for their organization. For some, it may be best to arrange the tree according the actual business organizational structure or geographic structure. For others, however, a one-to-one mapping to DNS layers may be best.

The DIT also provides the flexibility to support a wide range of administration scenarios, and can be administered in either a centralized or distributed manner. Centralized administration can be implemented where one authority manages the entire DIT. This type of administration is usually used in scenarios where the entire DIT resides on one mail server.

In order to properly route a message, the transfer unit 302 must access the directory information associated with each message that it processes. However, in a preferred embodiment, rather than querying the directory service 312 directly each time it processes a message, the transfer unit 302 caches the directory information in a directory cache 314. When the transfer unit processes a particular message, it accesses the appropriate directory information in the cache 314. When required, the transfer unit 302 uses the directory information in the cache 314 to update the routing table 312. Since a directory query for each recipient of each message is time-consuming and puts a large load on the mail server 301, by implementing the localized directory cache 314, performance of the email server 301 is improved. In addition, since the information stored in the directory service unit 310 is not always in the format required by the transfer unit 302, when creating the cache, the transfer unit reformats the directory information as required.

It should be noted that in most embodiments, a the transfer unit 302 can be configured to adhere to various mail delivery options which specify one or more delivery options for inbound email to a designated recipient. While inbound messages can be delivered into multiple message stores, message access servers (MAS) can read messages from only a designated one of them. The transfer unit 302 uses these attributes to determine the targets of message delivery for all messages submitted to a particular distribution list. Such attributes can include, but are not limited to: "autoreply", "program" where mail is delivered to a program, "forward" where mail is forwarded to another mailbox(es), "file" where the incoming message file is appended to another file, and "shared" where mail is delivered to a shared mailbox (this is typically used to set up a shared mailbox for a distribution list).

In the context of electronic mail, protocols are generally a high-level (not necessarily network specific) language spoken between two mailers. Transports are the low-level, network specific details used to implement a protocol on a given network. Thus email messages can come in to the transfer unit 302 by any one of a variety of transports and protocols—submitted directly by a local user, via TCP/IP as an SMTP message from an Internet system, by using a dial-up modem using the PhoneNet protocol, DECnet as a MAIL-11 message, DECnet as an SMTP message, UUCP, an X.400 transport, SNA, and so on. The transfer unit 302 then routes the message out using a transport and protocol appropriate for the message's destination address.

In the described embodiment, the transfer unit 302 uses what are referred to as channels to implement specific combinations of transports and protocols. Each different transport and protocol combination has an associated transfer unit channel. The transfer unit 302 postmaster initially configures the transfer unit 302 telling it what sorts of transports and protocols are in use at his site, and what sorts of destination addresses should be routed through which sorts of channels. For instance, at sites with an Internet connection, Internet addresses are normally routed through an SMTP over TCP/IP channel; but at sites with only a UUCP connection, Internet addresses would instead be routed through a UUCP channel. Once the transfer unit 302 is so configured using configuration data stored in a configuration table (not shown), the transfer unit 302 handles message routing and delivery automatically. In this way, ordinary users need never be aware of this underlying transport and routing; that is, they simply address and send their messages and the transfer unit 302 automatically routes and delivers them appropriately.

In most embodiments, the transfer unit 302 stores messages as text files. Messages with multiple parts (possibly containing different types of data) are represented as a series of text sections separated by special unique delimiter strings. In the described embodiment, the first few files in each email message are referred to as the message envelope that contains transport information. The message envelope is terminated by a line containing a boundary marker, or by a line containing two CTRL/A characters. The transfer unit 302 uses the contents of the envelope to make routing decisions. It does not use the content of the message. The content of the envelope is primarily defined by RFC 821. It includes the originator address, the recipient(s) address(es), and envelope ID.

The header lines of the message follow the envelope whose format is mandated by RFC 822. It should be noted that there may be any number of message header lines; the message header formed by this collection of header lines is terminated by a single blank line after which follows the message body. An Internet mail message starts with one or more headers. Each header is composed of a field name followed by a colon then a value which can be generated by, for example, the composer of a message or the mail client. A transfer unit can also add headers to a message. Each transfer unit that accepts a message adds a received header to that message. The last transfer unit to accept the message and to actually deliver the message to the message store adds a return-path header. The received and return-path headers provides information that enables you to trace the routing path taken by the message if a problem occurs.

Submitted messages from the Internet or local clients go to the transfer unit 302 via SMTP (Simple Mail Transport Protocol). If the message address is within the server 302 domain, the transfer unit 302 delivers the message to the message store 304. If, however, the message is addressed to another domain, the transfer unit 302 relays the message to another transport agent on the Internet or Intranet.

In a preferred embodiment, messages to the local domain are stored in the message store 304 depending on how the system is configured. Once messages are delivered to the appropriate mailbox, they can be retrieved, searched for, and manipulated by IMAP4 or POP3-based mail clients. The transfer unit 302 uses the directory 312 that, in a preferred embodiment, is configured as an LDAP type directory, to retrieve local user and group address information. When the transfer unit 302 receives a message, it uses the directory information to determine where the message should be delivered. The message store uses the directory services to authenticate users logging into their mailboxes. The message store 304 also obtains information about user message quota limits and message store type (IMAP or POP). Outgoing client messages go to the SMTP channel in the LDAP. The transfer unit 302 sends the message to an Internet transfer or, if the address is local, to the message store 304. It should be noted that the LDAP directory 312 is the master repository of all the information related to hosted domains. That is, the message access server retrieves the necessary information to associate a client with a domain from the LDAP directory 312. Similarly, the transfer unit 302 retrieves hosted domain information from the LDAP directory 312 to perform proper routing and address rewriting.

Figure 4:
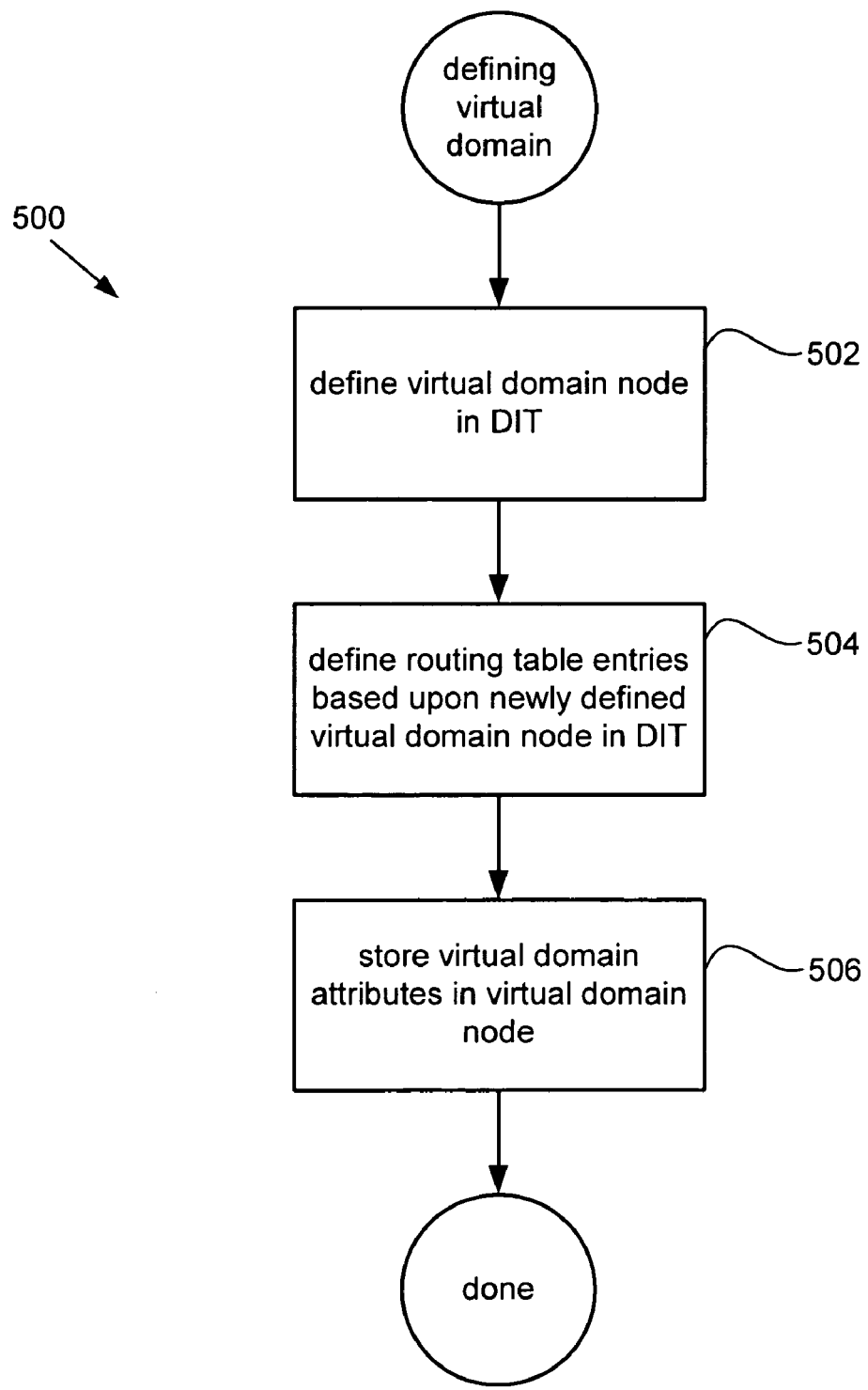
FIG. 4 shows a flowchart detailing a process whereby a virtual domain is defined in accordance with an embodiment of the invention.

Referring now to FIG. 4, showing a flowchart that details a process 500 for defining a virtual domain in accordance with an embodiment of the invention. The process 500 begins at 502 by defining a virtual domain node in the DIT. Once a the virtual domain node has been defined, corresponding routing table entries are defined at 504 and at 506, various virtual domain attributes are stored at the virtual domain node. It should be noted that the various virtual domain attributes include a list of services permitted the domain. Such services may include, for example, IMAP, IMAPS, POP3, POP3S, and SMTP, which in some cases requires presentation of credentials. Other of the services include identification of a domain administrator who is authorized to manage the particular virtual domain which includes setting particular user-level attributes for particular users in the domain. These services also include designation of a virtual domain postmaster who identifies email message delivery problems, and a state of the domain.

In a preferred embodiment, the state of the domain can be active indicating that all mail can be received, or the state can be inactive, where the particular domain has been temporarily suspended for various and sundry reasons, or, the state of the domain can be deleted indicating that the particular domain no longer exists.

Figure 5:
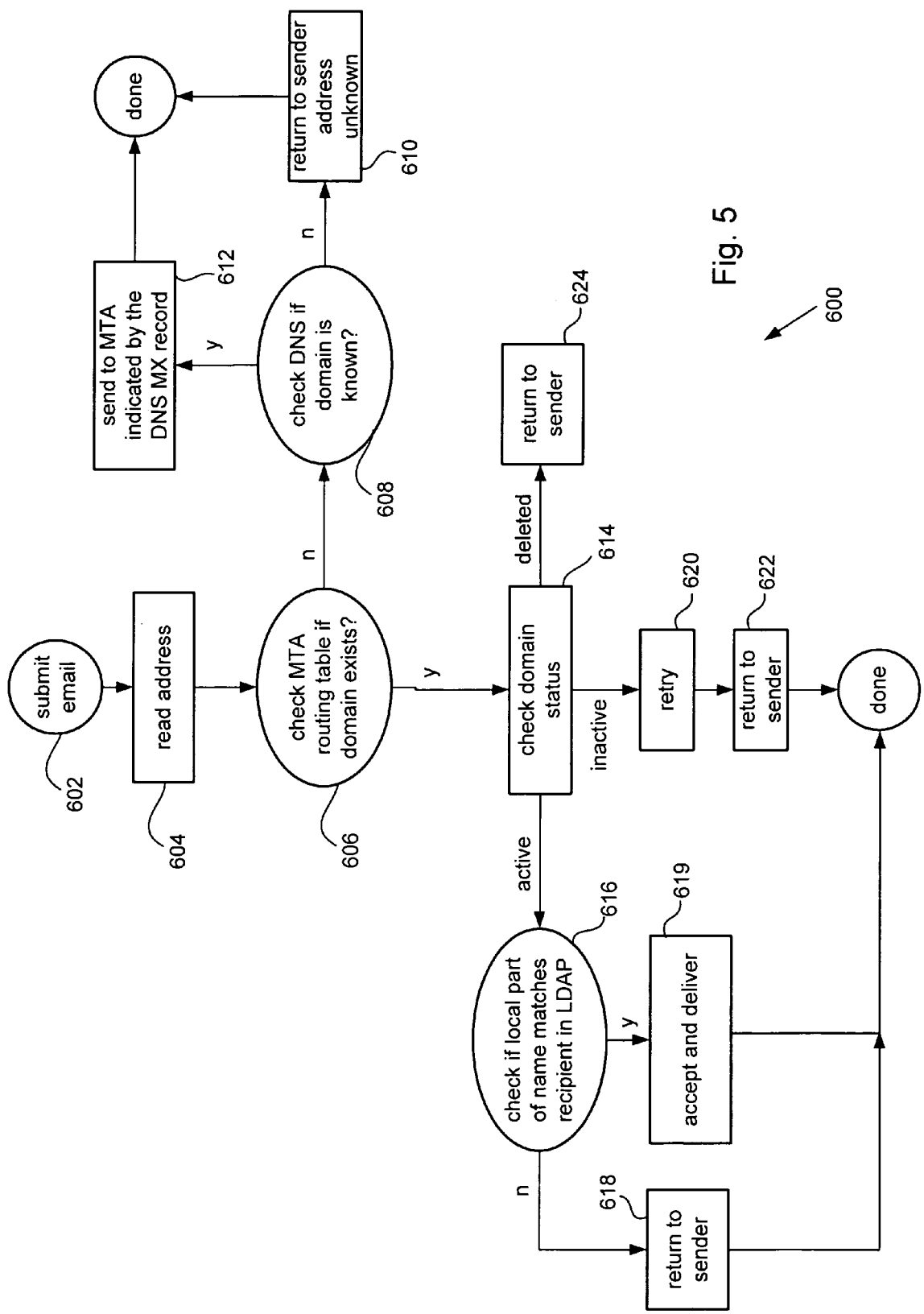
FIG. 5 shows a flowchart that details a process that describes a message data flow in accordance with an embodiment of the invention.

Referring now to FIG. 5 showing a flowchart that details a process 600 that describes a message data flow in accordance with an embodiment of the invention. The process 600 starts at 602 by the user submitting a message to be delivered to another user on the network via the SMTP protocol. At 604, the transfer unit reads the address and the routing information from the directory service server using the address domain information from the incoming message as a key. Using the address domain information from the incoming message, the transfer unit checks its routing table to determine if the address domain exists at 606. If the address domain does not exist, then a check is made of the DNS table at 608 to determine if the address domain is known. If the address domain name is not known, then an error message is returned to sender at 610 indicating the particular recipient address is unknown. On the other hand, if the address domain is known, then the email message is sent to the transfer agent indicated by the corresponding DNS MX record at 612 for eventual delivery.

Returning to 606, if it has been determined that the address domain does exist, then the status of the address domain is determined at 614. If the address domain status is active, then a check is made at 616 to determine if the local part of the email message's domain name matches the recipient in the LDAP directory. If the local part of the name does not match, then an error message is returned to the email sender at 618. If, however, the local part of the name does match, then the email message is accepted and delivered to the recipient's mailbox at 619.

Returning to 614, if the domain's status is inactive, then the message is not held, but returned with a transient error message that causes the sending MTA to retry after a preset interval at 620 for a predetermined length of time after which an error message is returned to the sender at 622. If, however, the domain's status is deleted, then an error message indicating as much is returned to sender at 624.

Figure 6:
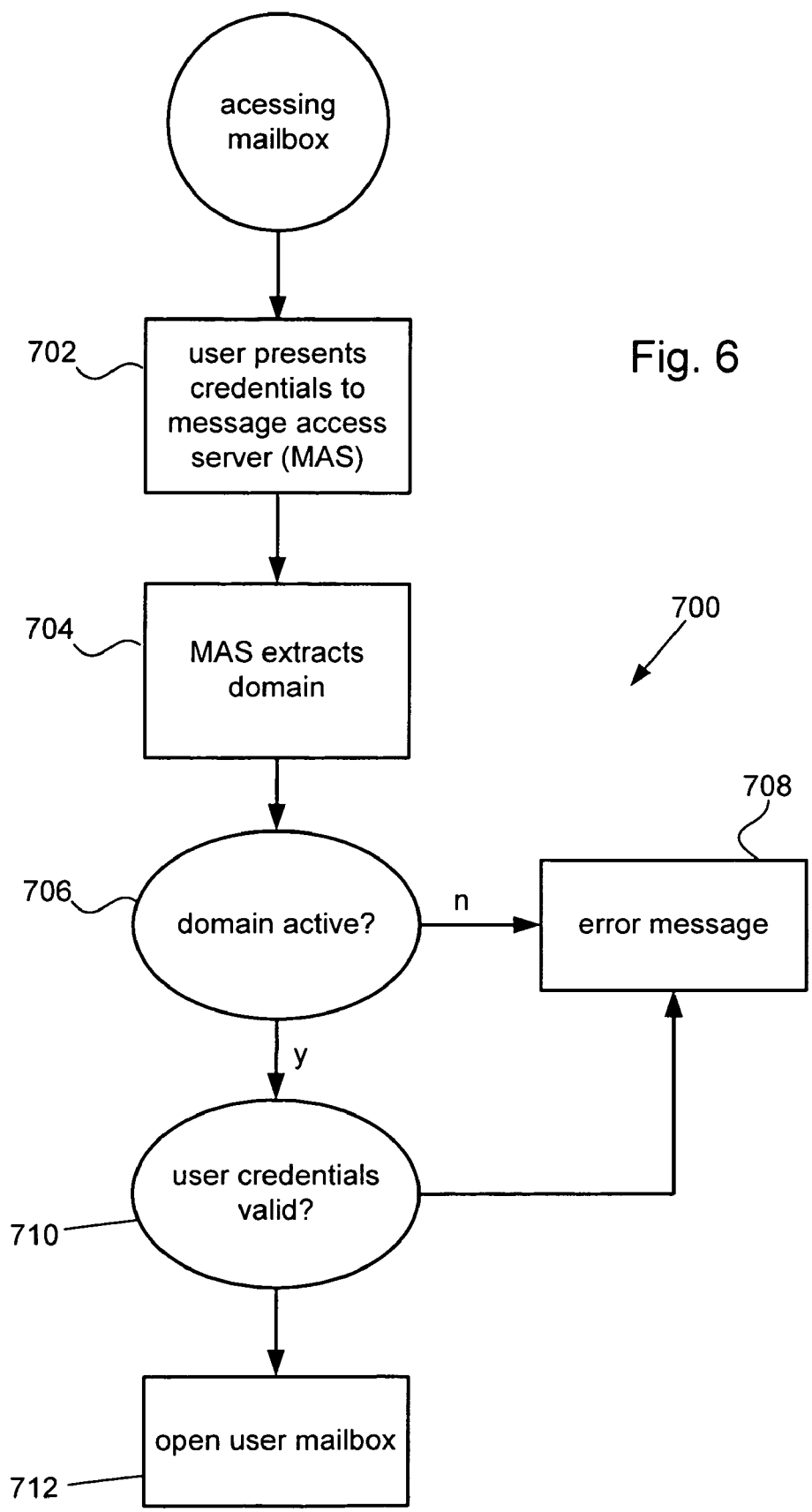
FIG. 6 shows a flowchart that details a process for accessing a delivered email message in accordance with an embodiment of the invention.

In order to access the delivered email message, a process 700 shown in FIG. 6 in accordance with an embodiment of the invention is employed. The process 700 begins at 702 by the user presenting his/her credentials to the message access server (MAS). The MAS, in turn, extracts the domain from the stored email message at 704 and determines at 706 whether or not the domain is active. If the domain is not active, then an error message is sent to the user at 708. Alternatively, if the domain is active, then a determination is made at 710 whether or not the presented credentials are valid. If the presented credentials are not valid, an error message is returned to the user at 708, otherwise, the user is granted access to the user mailbox at 712.

Figure 7:
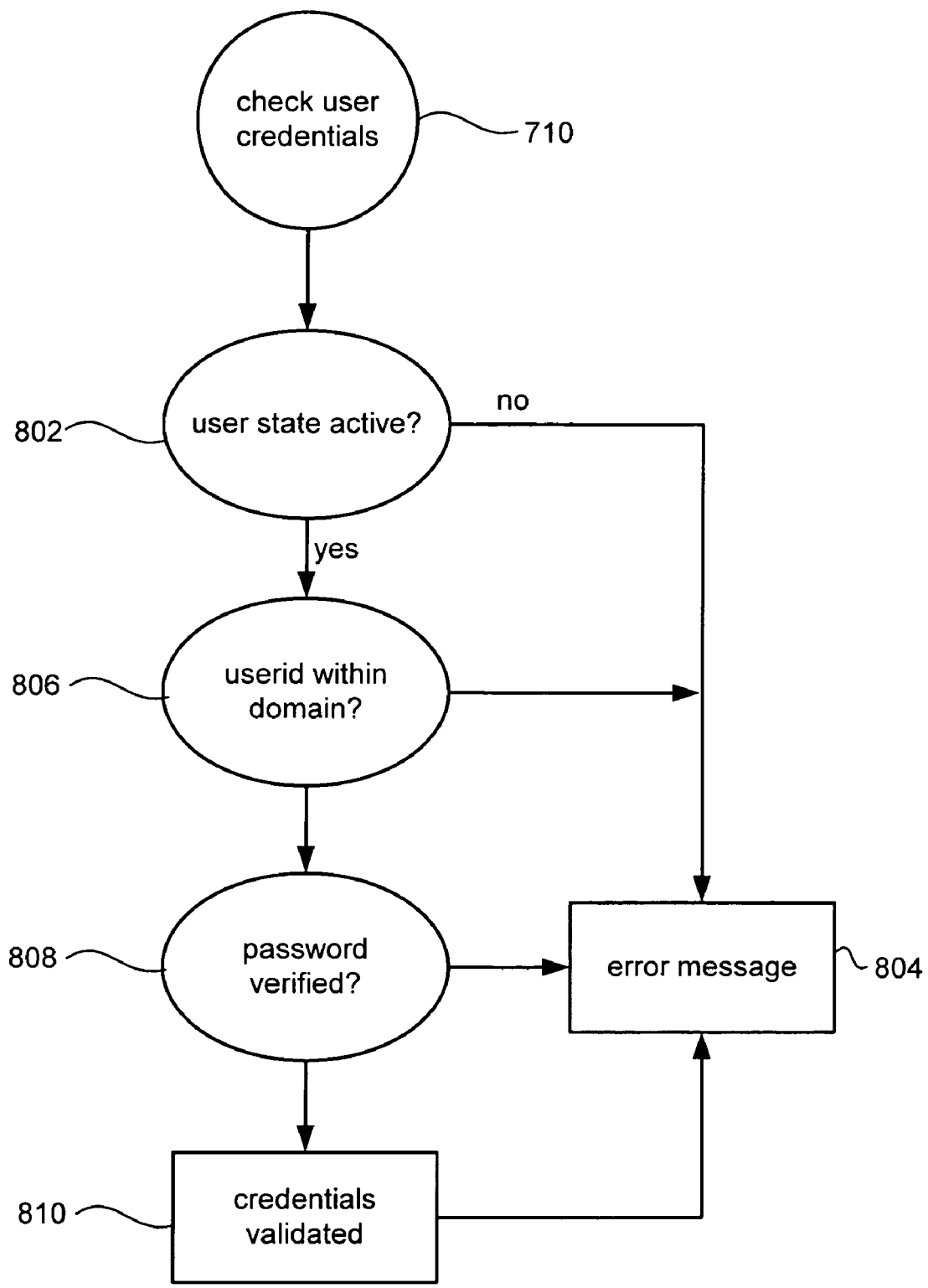
FIG. 7 shows a flowchart that details one implementation of a checking user credentials operation in accordance with an embodiment of the invention.

Referring now to FIG. 7 showing a flowchart that details one implementation of the checking user credentials operation 710 of the process 700. This particular implementation of the operation 710 begins at 802 by determining if the user state is active. If the user state is not active, then an error message is returned at 804, otherwise, a determination at 806 is made whether or not a userid associated with the user is within the domain. If the userid is not within the virtual domain, then an error message is returned at 804, otherwise, a determination is made at 808 whether or not a user supplied password is valid. If the user supplied password is not valid, then an error message is returned at 804, otherwise, the credentials have been deemed to be valid at 810.

Figure 8:
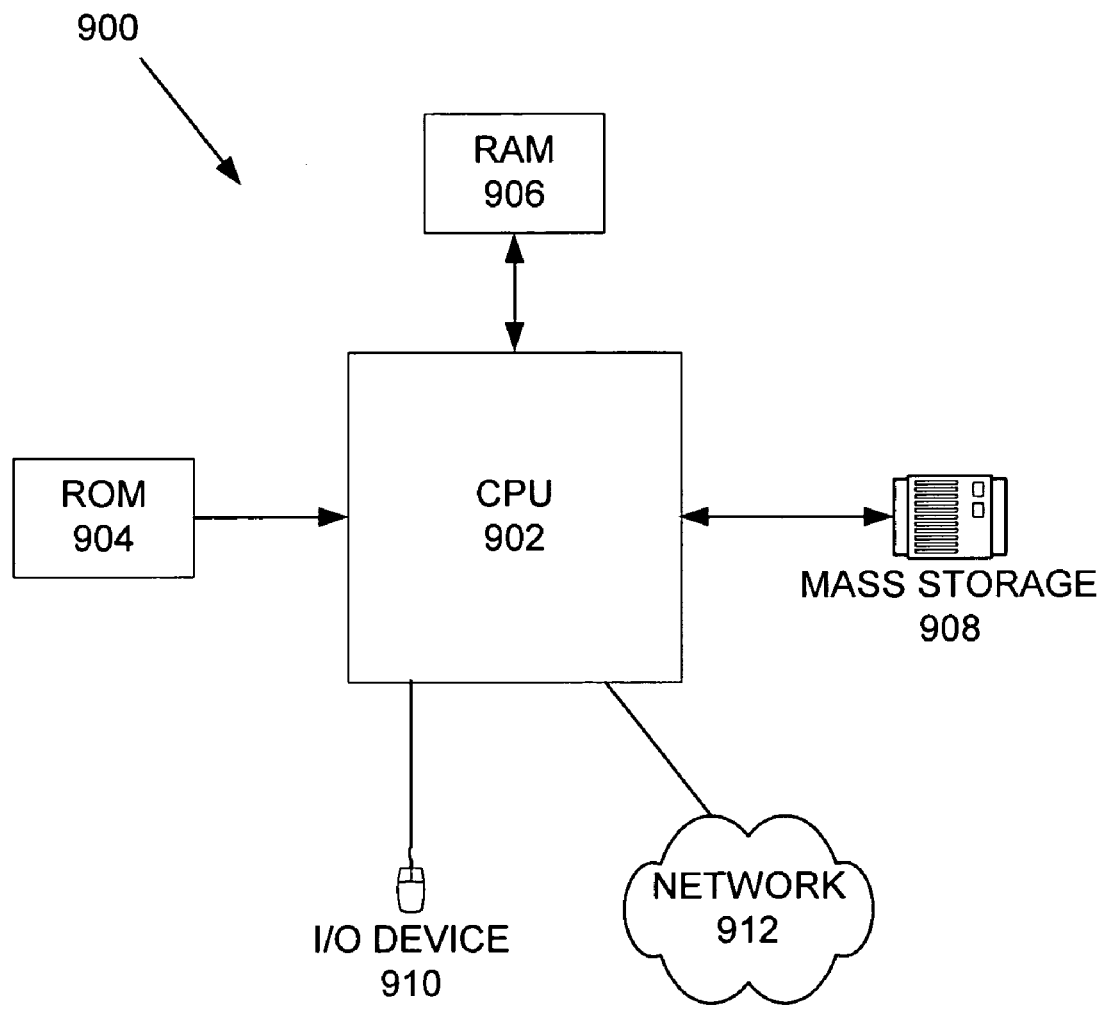
FIG. 8 illustrates a typical general-purpose computer system suitable for implementing the present invention.

FIG. 8 illustrates a typical, general-purpose computer system 900 suitable for implementing the present invention. The computer system 900 includes any number of processors 902 (also referred to as central processing units, or CPUs) that are coupled to memory devices including primary storage devices 904 (typically a read only memory, or ROM) and primary storage devices 906 (typically a random access memory, or RAM).

Computer system 900 or, more specifically, CPUs 902, may be arranged to support a virtual machine, as will be appreciated by those skilled in the art. One example of a virtual machine that is supported on computer system 900 will be described below with reference to FIG. 8. As is well known in the art, ROM acts to transfer data and instructions uni-directionally to the CPUs 902, while RAM is used typically to transfer data and instructions in a bi-directional manner. CPUs 902 may generally include any number of processors. Both primary storage devices 904, 906 may include any suitable computer-readable media. A secondary storage medium 908, which is typically a mass memory device, is also coupled bi-directionally to CPUs 902 and provides additional data storage capacity. The mass memory device 908 is a computer-readable medium that may be used to store programs including computer code, data, and the like. Typically, mass memory device 908 is a storage medium such as a hard disk or a tape which generally slower than primary storage devices 904, 906. Mass memory storage device 908 may take the form of a magnetic or paper tape reader or some other well-known device. It will be appreciated that the information retained within the mass memory device 908, may, in appropriate cases, be incorporated in standard fashion as part of RAM 906 as virtual memory. A specific primary storage device 904 such as a CD-ROM may also pass data uni-directionally to the CPUs 902.

CPUs 902 are also coupled to one or more input/output devices 910 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 902 optionally may be coupled to a computer or telecommunications network, e.g., an Internet network or an intranet network, using a network connection as shown generally at 912. With such a network connection, it is contemplated that the CPUs 902 might receive information from the network, or might output information to the network in the course of performing the above-described method steps. Such information, which is often represented as a sequence of instructions to be executed using CPUs 902, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, operations involved with accessing a user mailbox can be re-ordered Operations may also be removed or added without departing from the spirit or the scope of the present invention.

Although the methods defining a virtual domain in a messaging server in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

While the present invention has been described as being used with a computer system that has an associated virtual machine, it should be appreciated that the present invention may generally be implemented on any suitable object-oriented computer system. Specifically, the methods of defining a virtual domain in accordance with the present invention may generally be implemented in any multi-threaded, object-oriented system without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A method for defining a virtual domain in an electronic messaging system supporting a plurality of users, comprising:

defining a virtual domain node corresponding to a real domain name server in a hierarchically organized directory wherein the hierarchically organized directory is a hierarchical structure that resembles a tree with one major branch at the top and many branches and sub-branches below;

associating the virtual domain node with one of the plurality of users;

associating a plurality of virtual domain attributes to the virtual domain node, the plurality of virtual domain attributes including a state of the virtual domain and one or more messaging services for the virtual domain; and defining, for the virtual domain node, the one or more messaging services in a particular manner for the user associated with the virtual domain node.

2. A method as recited in claim 1, wherein the state of the virtual domain node is selected from the list comprising: active, inactive (or suspended), and deleted.

3. A method as recited in claim 1, wherein the tree based hierarchy is a standard based directory information tree (DIT) that includes a plurality of directory entries each of which is associated with a higher level (parent) directory entry.

4. A method as recited in claim 3, wherein the directory takes the form of a segmented name space.

5. A method as recited in claim 4, wherein the segmented name space includes a segmented name associated with a user that is segmented in such a way that the user is uniquely identified by a unique user name at a first hierarchical level and an associated domain name at a higher hierarchical level.

6. A method as recited in claim 5, wherein during a user name search operation, the user name is initially resolved at the higher hierarchical level and subsequently at the first hierarchical level such that in a multi-domain environment the search operation is performed as if the user name was part of a flat name space.

7. A method as recited in claim 6 further comprising:
defining a routing table based upon the segmented name space, wherein the routing table is used by a transfer agent to direct an appropriately addressed email message to a receiving user in the virtual domain.

8. A method as recited in claim 7, wherein the segmented name space is based upon the most direct path from the user name to the highest connected hierarchical level in the directory.

9. A method as recited in claim 1, wherein the electronic messaging system is an email messaging system.

10. A method as recited in claim 1, wherein the electronic messaging system is a voicemail messaging system.

11. A method as recited in claim 8, wherein the standard based directory is an LDAP based directory.

12. A computer-readable medium containing programming instructions for defining a virtual domain in an electronic messaging system supporting a plurality of users, the computer-readable medium comprising computer program code devices configured to cause a computer to execute the operations of:
defining a virtual domain node corresponding to a real (non-virtual) domain in a hierarchically organized directory wherein the hierarchically organized directory is a hierarchical structure that resembles a tree with one major branch at the top and many branches and sub-branches below; and
associating the virtual domain node with one of the plurality of users;
associating a plurality of virtual domain attributes to the virtual domain node, the plurality of virtual domain attributes including a state of the virtual domain and one or more messaging services for the virtual domain; and
defining, for the virtual domain node, the one or more messaging services in a particular manner for the user associated with the virtual domain node.

13. A computer-readable medium containing programming instructions for defining a virtual domain in an electronic messaging system as recited in claim 12, wherein the state of the virtual domain node is selected from the list comprising: active, inactive (or suspended), and deleted.

14. A computer-readable medium containing programming instructions for defining a virtual domain in an electronic messaging system as recited in claim 13, the computer-readable medium further comprising computer program code devices configured to cause a computer to execute the operations of:
defining a routing table based upon the segmented name space, wherein the routing table is used by a transfer agent to direct an appropriately addressed email message to a receiving user in the virtual domain.

15. A computer-readable medium containing programming instructions for defining a virtual domain in an electronic messaging system as recited in claim 14, the computer-readable medium further comprising computer program code devices configured to cause a computer to execute the operations of:
initially resolving a user name during a user name search operation at the higher hierarchical level and subsequently at the first hierarchical level such that in a multi-domain environment the search operation is performed as if the user name was part of a flat name space.

16. An electronic messaging system having a main host computer for transferring an incoming message between users including a sending subscriber and a receiving subscriber having an associated unique user name, comprising:
a messaging server coupled to the host computer arranged to receive the incoming message from the sending subscriber and arranged to forward the message to the receiving subscriber based upon the receiving subscriber's user name;
a hierarchically organized directory coupled to the messaging server arranged to define a virtual domain node corresponding to a real (non-virtual) domain, the virtual domain node associated with one of the users, the virtual domain node having associated with it a plurality of virtual domain attributes, wherein the hierarchically organized directory is a hierarchical structure that resembles a tree with one major branch at the top and many branches and sub-branches below, the plurality of virtual domain attributes including a state of the virtual domain and one or more messaging services for the virtual domain, the one or more messaging services defined in a particular manner for the user associated with the virtual domain node.

17. An electronic messaging system as recited in claim 16, wherein the state of the virtual domain node is selected from the list comprising: active, inactive (or suspended), and deleted.

18. An electronic messaging system as recited in claim 17, wherein the hierarchically organized directory is an LDAP based directory information tree (DIT) that includes a plurality of directory entries each of which is associated with a higher level (parent) directory entry and wherein the directory takes the form of a segmented name space.

19. An electronic messaging system as recited in claim 18, wherein the user name is segmented in such a way that the user is uniquely identified by a unique userid at a first hierarchical level and an associated domain name at a higher hierarchical level.

20. An electronic messaging system as recited in claim 19, wherein in order for the messaging server to forward the email message to the receiving subscriber, the messaging server executes a user name search operation.

21. An electronic messaging system as recited in claim 20, wherein the user name search operation comprises:
initially resolving the user name at a highest hierarchical level and subsequently at a lowest hierarchical level in such a way that when the name search operation is executed in a multi-domain environment, the search operation is performed as if the user name was part of a flat name space.

22. An electronic messaging system as recited in claim 21, wherein the messaging server further includes:
a routing table defined by the directory based upon the resolved receiving subscriber's user name that defines a path by which the email message is passed from the sending subscriber to the receiving subscriber; and a transfer agent arranged to direct the email message from the sending subscriber to the receiving subscriber as defined by the routing table.

23. A method for defining a virtual domain in an electronic messaging system supporting a plurality of users, the method comprising:

defining a plurality of virtual domain nodes in a hierarchically organized directory wherein the hierarchically organized directory is a hierarchical structure, each virtual domain node corresponding to a real domain name server;

associating each virtual domain node with a respective one of the plurality of users;

associating, for each of the virtual domain nodes, a plurality of virtual domain attributes to the node, the plurality of virtual domain attributes including a state of the virtual domain and one or more messaging services for the virtual domain;

defining, for each of the virtual domain nodes, the one or more messaging services in a particular manner for the user associated with that virtual domain node.

24. A method as recited in claim 23, wherein the state of the virtual domain node is selected from the list comprising: active, inactive, and deleted.

25. A method as recited in claim 23, further comprising:
hosting the plurality of virtual domain nodes on a single server.

26. A method as recited in claim 23, wherein the users are organizations.

* * * * *